United States Patent
Lee et al.

(10) Patent No.: US 7,028,368 B2
(45) Date of Patent: Apr. 18, 2006

(54) WIPER BLADE ASSEMBLY FOR MOTOR VEHICLE

(75) Inventors: Dong Hyun Lee, Dalseo-gu (KR); Kyung Hee Cho, Daegu (KR)

(73) Assignee: KCW Corporation, Daegu (KR)

( * ) Notice: Subject to any disclaimer, the term of this patent is extended or adjusted under 35 U.S.C. 154(b) by 10 days.

(21) Appl. No.: 10/765,893

(22) Filed: Jan. 29, 2004

(65) Prior Publication Data

US 2004/0181894 A1   Sep. 23, 2004

(30) Foreign Application Priority Data

Feb. 14, 2003 (KR) .................. 10-2003-0009331
Nov. 7, 2003 (KR) .................. 10-2003-0078590

(51) Int. Cl.
   *B60S 1/38* (2006.01)

(52) U.S. Cl. ............................ 15/250.201; 15/250.43; 15/250.361

(58) Field of Classification Search ............. 15/250.43, 15/250.44, 250.451, 250.201, 250.361, 250.452, 15/250.453, 250.454
See application file for complete search history.

(56) References Cited

U.S. PATENT DOCUMENTS

| | | | | | |
|---|---|---|---|---|---|
| 2,760,220 | A | * | 8/1956 | Deibel ................... | 15/250.452 |
| 2,876,482 | A | * | 3/1959 | Oishei .................... | 15/250.44 |
| 3,088,155 | A | * | 5/1963 | Smithers ................ | 15/250.201 |
| 5,970,569 | A | * | 10/1999 | Merkel et al. .......... | 15/250.43 |
| 6,588,048 | B1 | * | 7/2003 | Ohyama .................. | 15/250.43 |
| 2003/0014828 | A1 | * | 1/2003 | Edner-Walter et al. | 15/250.201 |

* cited by examiner

*Primary Examiner*—Gary K. Graham
(74) *Attorney, Agent, or Firm*—Roylance, Abrams, Berdo & Goodman, L.L.P.

(57) ABSTRACT

The present invention relates to a wiper blade for wiping a windshield of a motor vehicle, and more particularly, to a so-called flat blade wiper which can be connected to a wiper arm without a primary and a secondary yokes. The wiper blade assembly comprises a flexible elongated wiper strip that includes opposite longitudinal grooves and comes into close contact with a windshield of the vehicle; a rail spring including rail portions disposed in the opposite grooves of the wiper strip; an elastic support member that extends along a longitudinal direction of the wiper strip and includes a plurality of openings; and a connection member which includes an inserting portion inserted in the opening of the elastic support member for connection with the elastic support member and a claw for holding both the wiper strip and the rail spring.

8 Claims, 12 Drawing Sheets

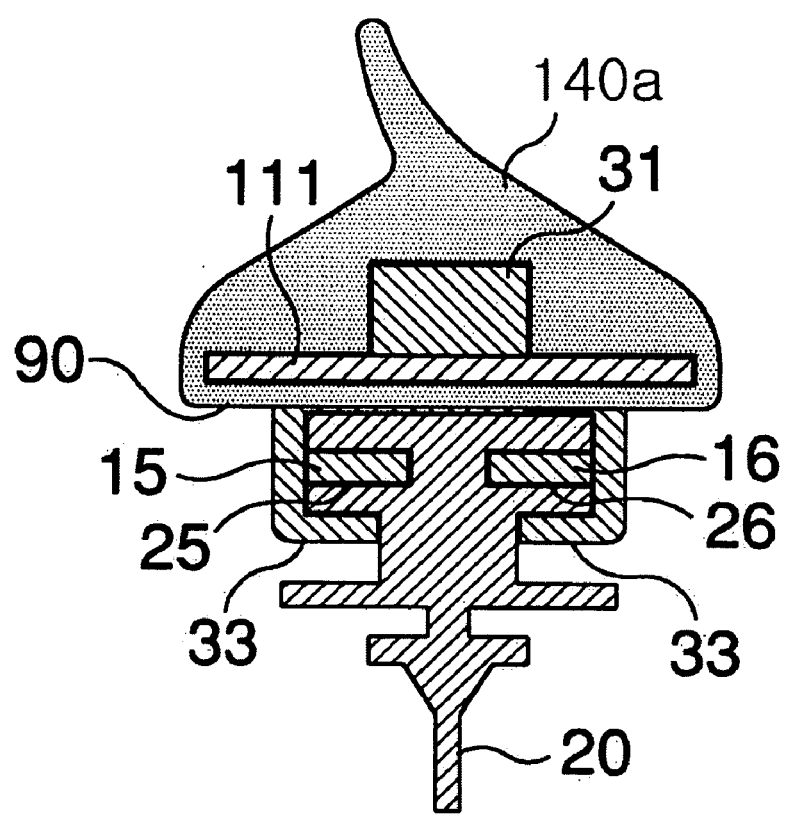

WIPER BLADE ASSEMBLY FOR MOTOR VEHICLE

BACKGROUND OF THE INVENTION

1. Field of the Invention

The present invention relates to a wiper blade for wiping a windshield of a motor vehicle, and more particularly, to a so-called flat blade wiper which can be connected to a wiper arm without a primary and a secondary yokes.

2. Description of the Related Art

An example of the conventional flat blade wiper is disclosed by U.S. Pat. No. 5,970,569. The wiper blade disclosed in the patent is configured in such a manner that a wiper strip made of a rubber is inserted into a load supporting element that has a slit formed at the center thereof and is made of spring steel and the wiper strip is then fixed to the load supporting element using a claw.

In the conventional flat blade wiper, however, manufacturing cost is high because a connecting device that is connected to the wiper arm is complicated. Further, although the wiper blade requires higher longitudinal rigidity due to its repeated motion, such rigidity can be provided to the flat blade only by the load-supporting element taking the shape of a □-shaped rail. Therefore, a shaking or chattering is generated in the conventional flat blade due to the repeated motion of the wiper blade.

SUMMARY OF THE INVENTION

The object of the present invention is to provide a wiper blade assembly wherein its longitudinal rigidity is increased such that a shaking or chattering due to its repeated motion can be reduced.

Another object of the present invention is to provide a wiper blade assembly in which an elastic support member and a connection member can be easily connected with each other.

A further object of the present invention is to provide a wiper blade assembly for preventing a wiper from rising even though a vehicle travels at a high speed.

According to an aspect of the present invention for achieving the objects, there is provided a wiper blade assembly for a motor vehicle which comprises a flexible elongated wiper strip that includes opposite longitudinal grooves and comes into close contact with a windshield of the vehicle; a rail spring including rail portions disposed in the opposite grooves of the wiper strip; an elastic support member that extends along a longitudinal direction of the wiper strip and includes a plurality of openings; and a connection member which includes an inserting portion inserted in the opening of the elastic support member for connection with the elastic support member and a claw for holding both the wiper strip and the rail spring.

According to the wiper blade assembly for a motor vehicle, longitudinal rigidity of the wiper blade assembly is increased due to the elastic support member, whereby a shaking or chattering phenomenon due to repeated motions of the wiper blade assembly is reduced.

Preferably, the inserting portion is fitted into the opening of the elastic support member.

According to the wiper blade assembly, since the inserting portion is fitted into the opening of the elastic support member, its assembly process can be very simplified and assembly time can be shortened.

Preferably, the connection member and the elastic support member are connected with each other by means of welding.

According to the wiper blade assembly, since the connection member and the elastic support member are connected with each other by means of welding, more secure connection can be obtained.

More preferably, the inserting portion and the claw are formed integrally with each other.

According to the wiper blade assembly, since the connection member is manufactured by integrally forming the inserting portion with the claw, a process of joining the inserting portion and the claw can be omitted and the manufacturing work therefor can be facilitated.

According to another aspect of the present invention, there is provided a wiper blade assembly for a motor vehicle which comprises a flexible elongated wiper strip that includes opposite longitudinal grooves and comes into close contact with a windshield of the vehicle; a rail spring including rail portions disposed in the opposite grooves of the wiper strip; and an elastic support member that extends along a longitudinal direction of the wiper strip and includes a claw for holding both the wiper strip and the rail spring.

According to the wiper blade assembly, since the claw for holding the wiper strip and the rail spring is provided directly on the elastic support member extending along a longitudinal direction of the wiper strip, the manufacturing work and assembly work can be facilitated. Further, longitudinal rigidity of the wiper blade assembly is increased due to the elastic support member, whereby a shaking or chattering phenomenon due to repeated motions of the wiper blade assembly is reduced.

Preferably, the claw extends along the entire longitudinal length of the wiper strip.

According to the wiper blade assembly, since the claw extends along the entire longitudinal length of the wiper strip, the connection between the elastic support member and the wiper strip can be more firmly made and longitudinal rigidity of the wiper is further increased accordingly.

According to a further aspect of the present invention, there is provided a wiper blade assembly for a motor vehicle which comprises a flexible elongated wiper strip that includes opposite longitudinal grooves and comes into close contact with a windshield of the vehicle; a rail spring including rail portions disposed in the opposite grooves of the wiper strip; an elastic support member that extends along a longitudinal direction of the wiper strip and includes a plurality of openings; and a connection member which includes an inserting portion inserted in the opening of the elastic support member for connection with the elastic support member and a claw for holding both the wiper strip and the rail spring.

In addition, the inserting portion of the connection member includes a pair of elastic pieces which can be elastically deformed into a state where the elastic pieces can pass through the opening of the elastic support member and can be elastically restored to a state where the elastic pieces can be caught into the elastic support member not to come out from the opening after the elastic pieces have passed through the opening.

According to the wiper blade assembly, since the pair of elastic pieces which can pass through the opening of the elastic support member and then can be elastically restored not to come out from the opening is provided, the wiper strip can be very simply mounted to the elastic support member in one touch mode in the case of a so-called flat blade wiper.

It is preferred that each of the elastic pieces have a sectional shape of a sector as viewed from a lateral direction of the elastic support member. However, if the elastic pieces can be inserted into the opening of the elastic support member when they are elastically deformed and if the elastic pieces cannot come out from the opening when they are elastically restored after they have passed through the opening, the elastic pieces having any other shapes may be employed.

Furthermore, a spoiler may be provided on a top surface of the elastic support member, whereby the unnecessary rise of the wiper blade assembly from a vehicle windshield can be prevented even though the vehicle mounted with such a wiper blade assembly travels at a high speed.

Preferably, the spoiler includes a claw portion for holding the elastic support member and is attached to the elastic support member by means of an adhesive. Therefore, since the claw portion is integrated into the spoiler, the spoiler can be more firmly attached to the elastic support member.

The wiper blade assembly may further comprise a connector for connecting a wiper arm to the substantial center of the elastic support member, wherein the spoiler is separated at a position of the connector on the top surface of the elastic support member. Here, the spoiler is divided into two parts with respect to the connector of the wiper arm.

The wiper blade assembly as claimed in claim 10, wherein the claw portion covers an entire bottom surface of the elastic support member.

BRIEF DESCRIPTION OF THE DRAWINGS

The above and other objects, features and advantages of the present invention will become apparent from the following description of preferred embodiments given in conjunction with the accompanying drawings, in which:

FIG. 12 shows a sectional view of the wiper blade assembly with a spoiler mounted thereto according to an embodiment of the present invention.

DETAILED DESCRIPTION OF THE INVENTION

Hereinafter, the present invention will be described in detail with reference to accompanying drawings.

Figure 1:
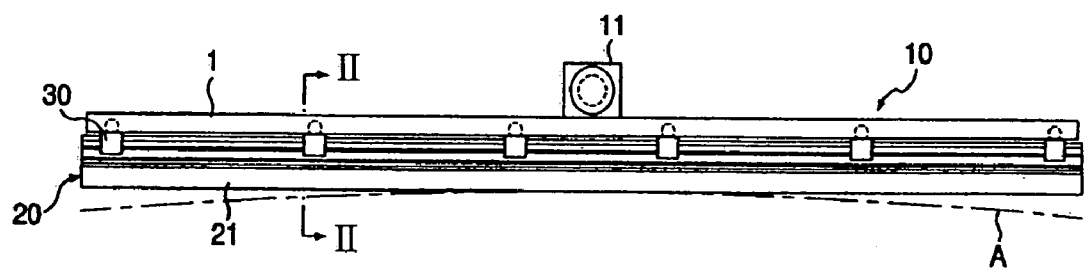
FIG. 1 shows a side view of a wiper blade assembly according to an embodiment of the present invention.

FIG. 1 shows a side view of a wiper blade assembly 10 according to the present invention. As shown in FIG. 1, the wiper blade assembly 10 comprises an elastic support member 1, a wiper strip 20, and a connection member 30 that connects the elastic support member 1 and the wiper strip 20. The elastic support member 1 extends along a longitudinal direction of the wiper strip 20 and is formed with an opening (not shown) at the bottom thereof. Here, an inserting portion 31 of the connection member 30 can be inserted into the opening of the elastic support member 1. The elastic support member 1 has predetermined flexibility such that it can be suitably curved together with the wiper strip 20 to correspond to a curvature of a vehicle windshield.

FIG. 1 schematically shows the wiper blade assembly. However, an original shape of the actual wiper blade assembly 10 is curved to have a predetermined curvature as shown as a dotted line A. The wiper blade assembly is designed such that its curvature is larger than a maximum curvature of an actual windshield of the vehicle. In practice, when the wiper blade assembly 10 comes into contact with a windshield of the vehicle, both ends of the wiper strip 20 first come into contact with the windshield of the vehicle and a central portion of the wiper blade assembly 10 is slowly pressed down by a wiper arm (not shown) so that the whole wiper strip is brought into close contact with the windshield of the vehicle. The predetermined curvature is calculated such that a contact pressure is distributed uniformly throughout the whole wiper strip by means of a force applied by the wiper arm.

Figure 2:
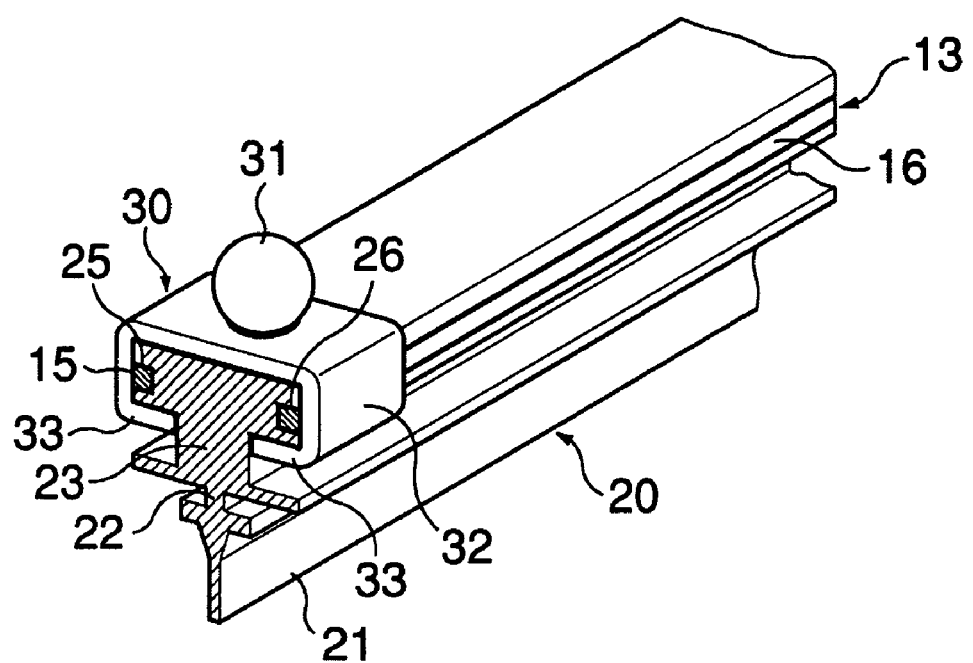
FIG. 2 shows a partial perspective view of the wiper blade assembly according to the embodiment of the present invention, in which its section taken along line II—II of FIG. 1 is depicted.

FIG. 2 shows a partial perspective view of the wiper blade assembly 10, in which a section taken along line II—II of FIG. 1 is depicted.

As shown in FIG. 2, the wiper strip 20 comprises a wiper lip 21 which comes into direct contact with the windshield of the vehicle so as to remove foreign substances accumulated on the vehicle windshield or to wipe out rain, snow or the like fallen on the vehicle windshield when it operates. The wiper lip 21 is made of a rubber material. The wiper lip 21 is connected to a wiper body portion 23 by a tilting strut 22. When the wiper blade assembly operates in such a manner that the wiper lip 21 is slid along a surface of the vehicle windshield, the tilting strut 22 is properly tilted from side to side to allow the wiper lip 21 to move smoothly.

Further, the wiper strip 20 includes opposite grooves 25 and 26 that are formed at an upper portion of the wiper body portion 23 in a longitudinal direction of the wiper strip 20. It is preferred that the grooves 25 and 26 be formed along the entire length of the wiper strip 20. Rails 15 and 16 of a rail spring 13 are disposed in the grooves 25 and 26.

According to the present invention, the connection member 30 is provided as shown in FIG. 2. The connection member 30 comprises the inserting portion 31 that is inserted into the opening of the elastic support member 1 for their connection and a claw 32 that is integrally formed with the inserting portion 31 and allows the wiper strip 20 and the rail spring 13 to be simultaneously held.

The inserting portion 31 may take the shape of a sphere, a disc, or a rectangle.

The claw 32 includes a claw portion 33 which in turn covers the wipe strip 20 to allow the connection member 30 and the wiper strip 20 to be connected with each other, as shown in FIG. 2.

The inserting portion 31 of the connection member 30 is inserted into the opening of the elastic support member 1 and they are connected with each other by means of press fit or welding.

Since the inserting portion 31 of the connection member 30 is inserted in the opening of the elastic support member 1 and the claw 32 is clamped with the wiper strip 20, the elastic support member 1 and the wiper strip 20 are connected with each other via the connection member 30.

Figure 3:
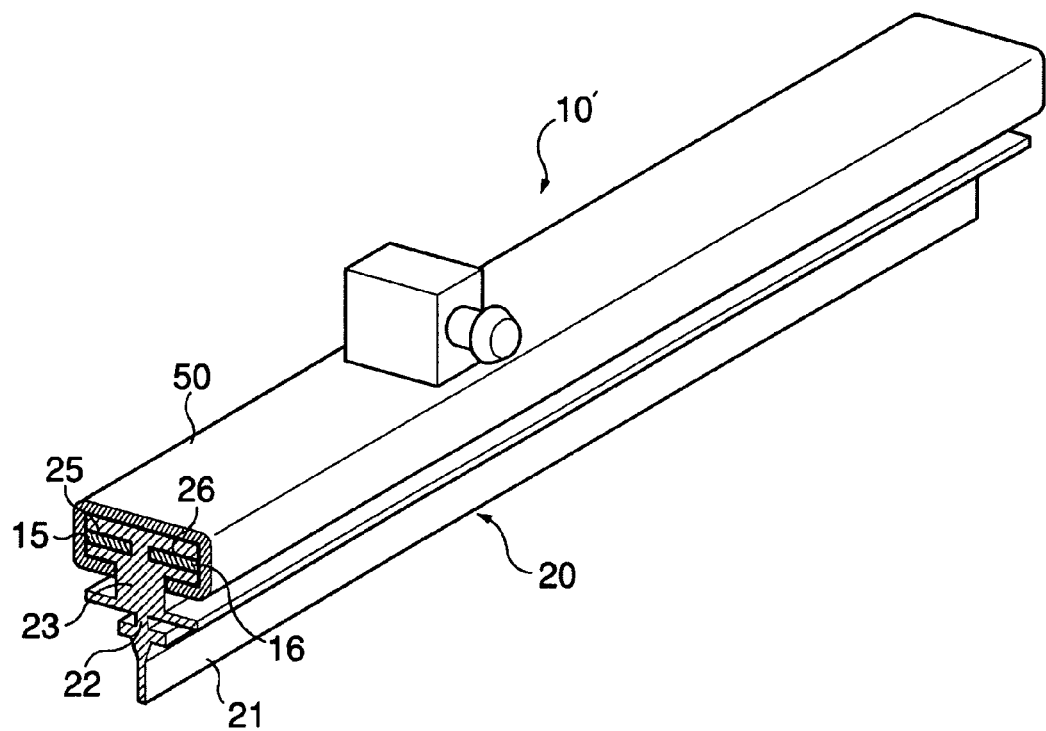
FIG. 3 shows a partial perspective view of a wiper blade assembly according to another embodiment of the present invention.

FIG. 3 shows a perspective view of a wiper blade assembly 10' according to another embodiment of the present invention, in which its section is depicted. In this figure, the same elements as the embodiment shown in FIGS. 1 and 2 are designated by like reference numerals.

The wiper blade assembly 10' comprises an elastic support member 50 including a claw that extends in a longitudinal direction of the wiper strip 20 and holds the wiper strip 20 and the rail springs 15 and 16.

The claw may extend along the entire length of the wiper strip 20 as shown in FIG. 3. Alternatively, it may extend along a part of the total length of the wiper strip. Moreover, a plurality of the claws may be intermittently formed along the wiper strip.

Longitudinal rigidity of the wiper can be increased by such an elastic support member 50. Further, since the claw for holding the wiper strip 20 is simultaneously provided directly on the elastic support member 50, the configuration of the wiper blade assembly 10' can be simplified as compared with the aforementioned embodiment.

Figure 4:
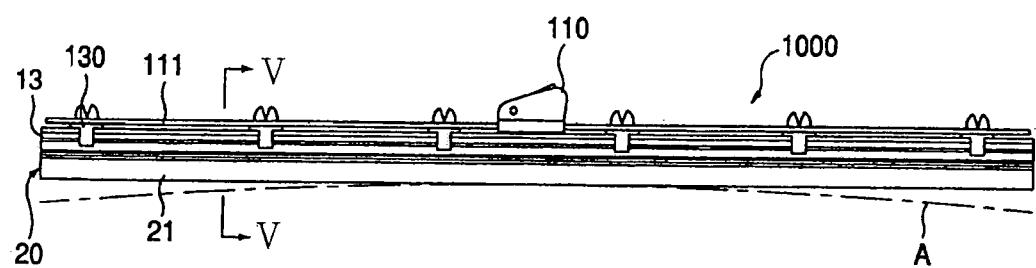
FIG. 4 shows a side view of a wiper blade assembly according to a further embodiment of the present invention.

FIG. 4 shows a side view of a wiper blade assembly 1000 according to a further embodiment of the present invention. In this embodiment, the same elements as the previous embodiments are designated by like reference numerals.

As shown in FIG. 4, a wiper blade assembly 1000 comprises an elastic support member 111, a wiper strip 20, and a connection member 130 that connects the elastic-support member 111 and the wiper strip 20. The elastic support member 111 extends in a longitudinal direction of the wiper strip 20 and is formed with an opening 100 (FIG. 6) at the bottom thereof, into which inserting portions 31a and 31b of the connection member 130 to be described later can be inserted. The elastic support member 111 has predetermined flexibility such that it can be suitably curved together with the wiper strip 20 to correspond to the curvature of the vehicle windshield.

Further, a connector assembly 110 to which the wiper arm can be connected is connected to the elastic support member 111 at a central portion thereof.

Furthermore, the inserting portions or elastic pieces 31a and 31b of the connection member 130 penetrate through the opening 100 of the elastic support member 111.

Figure 5:
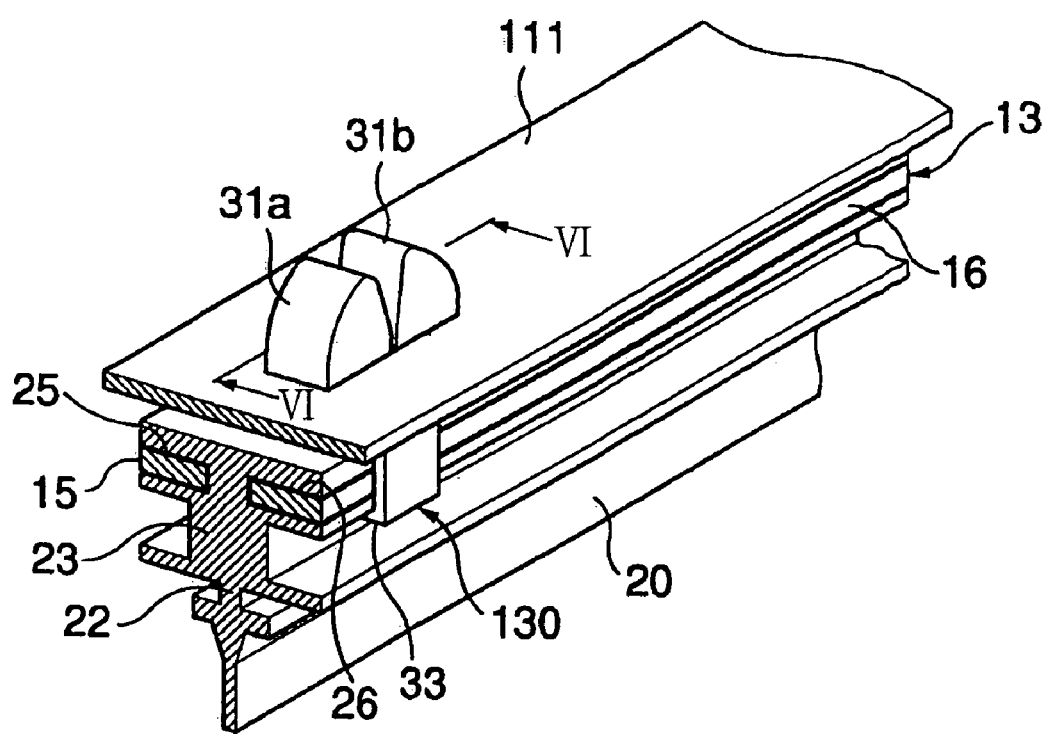
FIG. 5 shows a partial perspective view of the wiper blade assembly, in which its section taken along line V—V of FIG. 4 is depicted.

FIG. 5 shows a partial perspective view of the wiper blade assembly 1000, in which its section taken along line V—V of FIG. 4 is depicted.

Further, the wiper strip 20 includes opposite grooves 25 and 26 that are formed at an upper portion of the wiper body portion 23 in a longitudinal direction of the wiper strip 20. It is preferred that the grooves 25 and 26 be formed along the entire length of the wiper strip 20. Rails 15 and 16 of a rail spring 13 are disposed in the grooves 25 and 26.

According to the present invention, the connection member 130 is provided as shown in FIG. 5. The connection member 130 comprises a pair of the elastic pieces 31a and 31b that is inserted into the opening 100 of the elastic support member 111 for their connection and a claw 33 that is integrally formed with the pair of elastic pieces 31a and 31b and allows the wiper strip 20 and the rail spring 13 to be simultaneously held.

Figure 6:
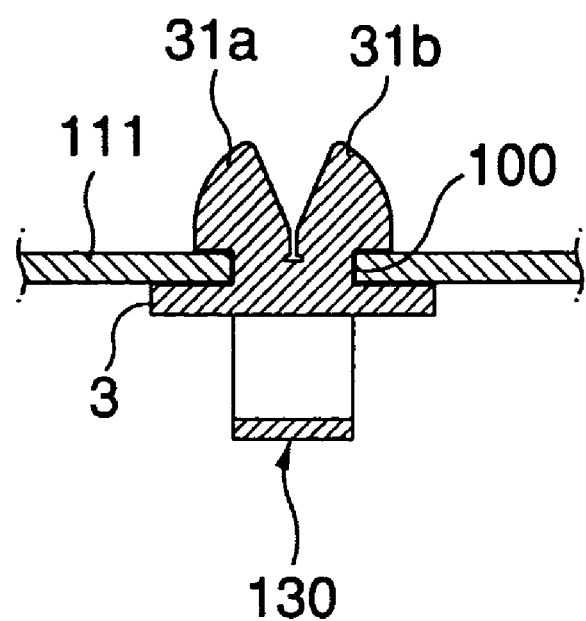
FIG. 6 shows a partial sectional view taken along line VI—VI of FIG. 5.

FIG. 6 shows a partial sectional view taken along line VI—VI of FIG. 5. For simple illustration, only the elastic support member 111 and the connection member 130 are shown in FIG. 6.

Referring to FIG. 6, a section of the pair of the elastic pieces 31a and 31b takes the shape of a sector as viewed from a lateral direction of the elastic support member 111. The connection member 130 is formed with a stopper 3 adjacent to the elastic pieces 31a and 31b. The connection member 130 is inserted into the opening 100 from below the elastic support member 111. When the connection member 130 starts to be inserted into the opening 100, circular arc portions of the elastic pieces 31a and 31b come into contact with the elastic support member 111. If the connection member 130 is further inserted, the elastic pieces 31a and 31b thereof are elastically deformed in a direction in which they face each other. The elastic pieces 31a and 32b of the connection member 130 are formed to have such a size that they can pass through the opening 100 when they are elastically deformed as described above. After the elastic pieces 31a and 31b have fully passed through the opening 100, the elastic pieces 31a and 31b are restored to an original shape shown in FIG. 6. Thereafter, the elastic pieces 31a and 31b cannot be escaped from the opening 100 in the inserting direction, and the stopper 3 prevents the elastic pieces 31a and 31b from further moving into the opening 100.

A sectional shape of the elastic pieces 31a and 3b, which is viewed from the lateral direction of the elastic support member 111, is not limited to a sector shape. If the elastic pieces 31a and 31b can pass through the opening of the elastic support member 111 when they are elastically deformed and if the elastic pieces 31a and 31b cannot be escaped from the opening 100 after they have passed through the opening, any types of the elastic pieces so configured can be employed. Further, although the rectangular opening 100 is used in this embodiment, any shapes can be used herein if the above conditions are satisfied.

Furthermore, if the connection member 130 having these elastic pieces 31a and 31b is employed, it is not necessary to perform a complicated process such as welding and it is possible to allow the elastic support member 111 to be thinner. Therefore, the advantages that the assembly process is conveniently performed and the costs of production are reduced can be obtained.

The claw 33 of the connection member 130 covers the wiper strip 20 to allow the connection member 130 and the wiper strip 20 to be clamped with each other, as shown in FIG. 5.

As described above, since the elastic pieces 31a and 31b of the connection member 130 conveniently penetrate through the opening of the elastic support member 111 for their connection and the claw 32 is clamped with the wiper strip 20, the elastic support member 111 and the wiper strip 20 are connected with each other via the connection member 130.

Figure 7:
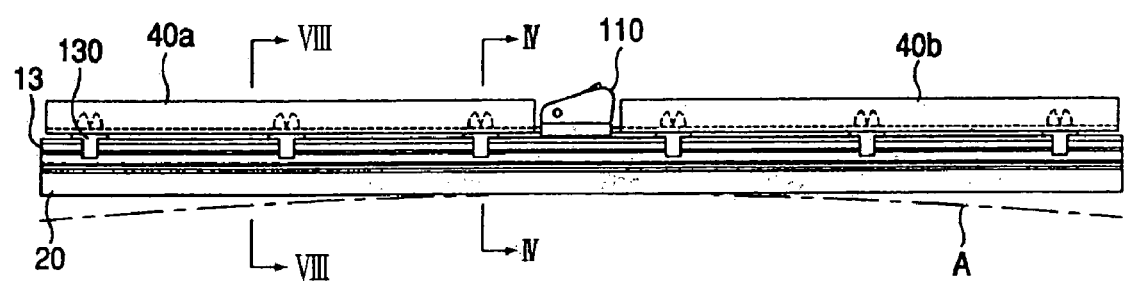
FIG. 7 shows a side view of a wiper blade assembly according to a still further embodiment of the present invention.

FIG. 7 shows a side view of a wiper blade assembly according to a still further embodiment of the present invention. This embodiment is different from the embodiments shown in FIGS. 4 to 6 in that spoilers 40a and 40b are further provided on the top surface of the elastic support member 111.

Figure 8:
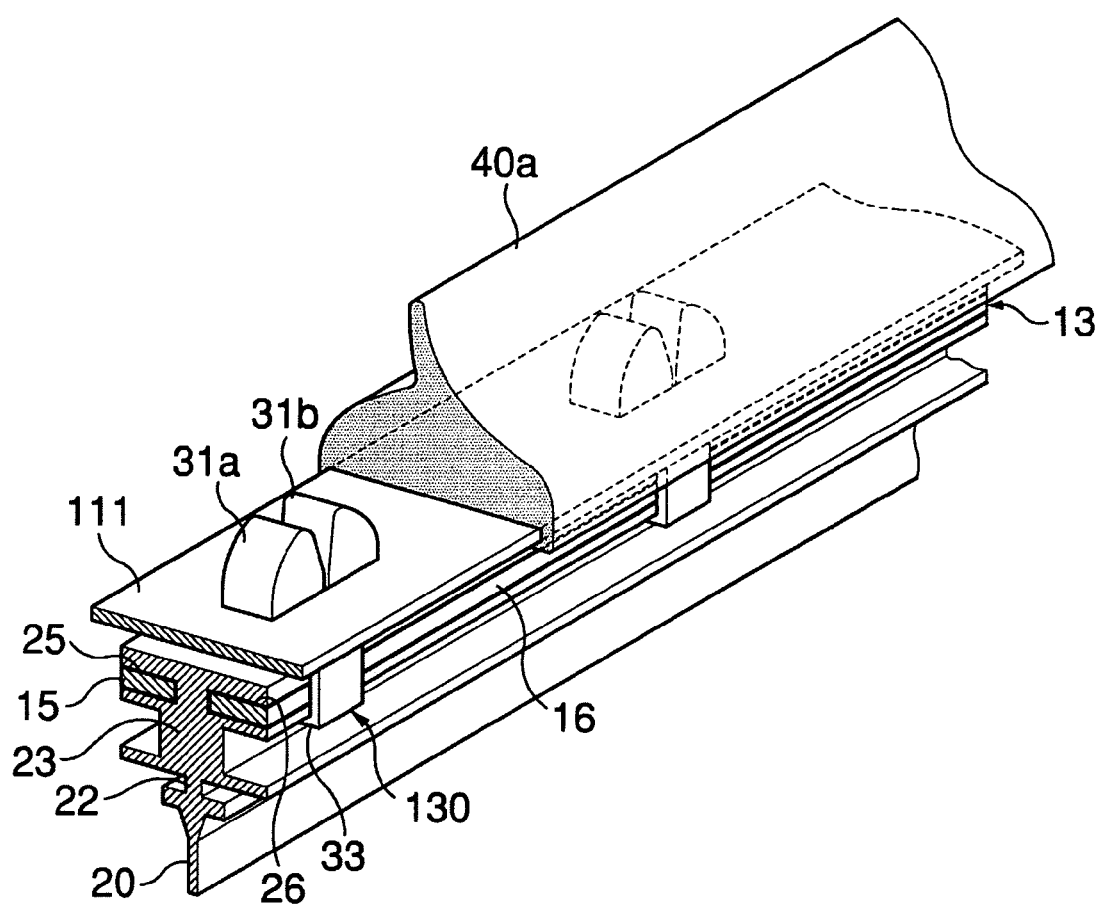
FIG. 8 shows a partial perspective view of the wiper blade assembly, in which its section taken along line VIII—VIII of FIG. 7 is depicted.

FIG. 8 shows a partial perspective view of the wiper blade assembly, in which its section taken along line VIII—VIII of FIG. 7 is depicted. As shown in FIG. 8, the elastic pieces 31a and 31b that have penetrated through and protruded from the opening 100 of the elastic support member 111 are embedded in the spoiler 40a. The shapes of the spoilers 40a and 40b can vary according to the need for design and is not also limited to the shape shown in FIGS. 8 and 9. Further, the spoilers 40a and 40b can be hollow, if necessary.

Figure 9:
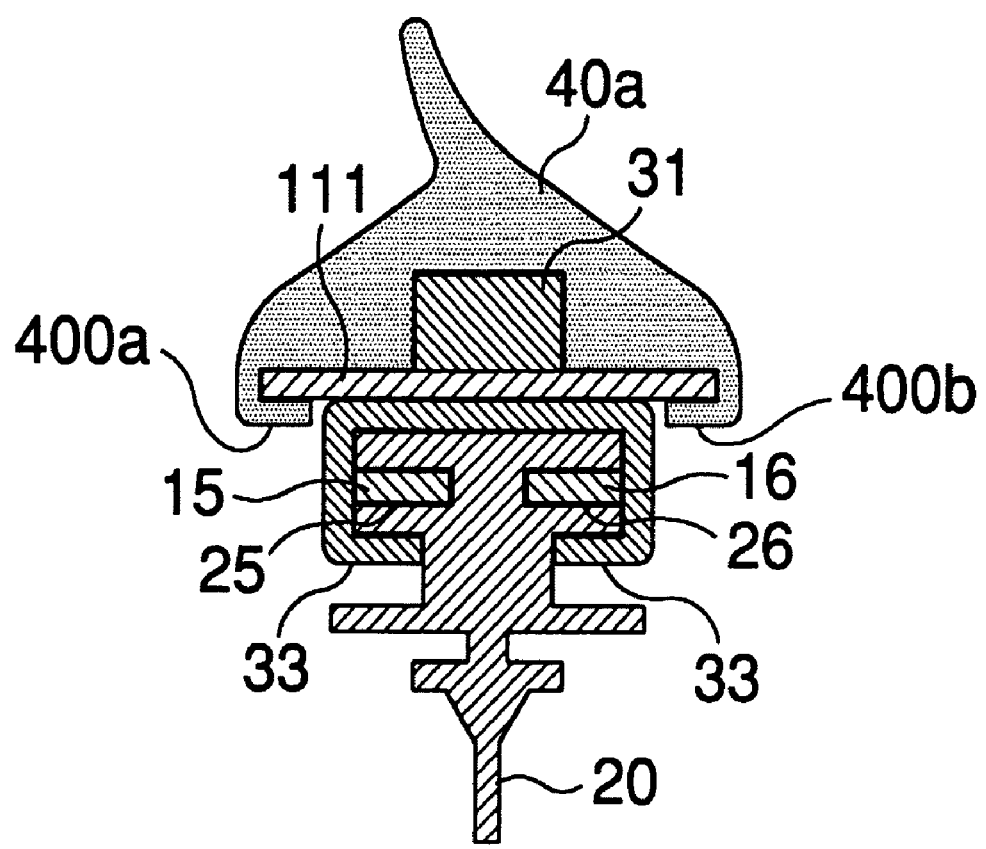
FIG. 9 shows a sectional view of the wiper blade assembly taken along line IV—IV of FIG. 7.

FIG. 9 shows a sectional view taken along line IV—IV of FIG. 7.

The configuration in which the connection member 130 is connected with the elastic support member 111 and with the wiper strip 20 is the same as that of the embodiment shown in FIGS. 4 to 6. It is preferred that the spoiler 40a include claw-shaped ends 400a and 400b for holding both ends of the elastic support member 111. The spoiler is divided into the left and right spoilers 40a and 40b with respect to the connector assembly 110, and the spoilers 40a and 40b can be attached to the elastic support member 111 by means of an adhesive etc.

FIG. 12 shows a sectional view of a wiper blade assembly to which another spoiler 140a is attached. In this embodiment, the spoiler 140a is configured such that its lower portion covers an entire bottom surface of the elastic support member 111. Thus, the spoiler 140 can be attached to the elastic support member 111 more firmly as compared with the embodiment shown in FIG. 9.

Figure 10:
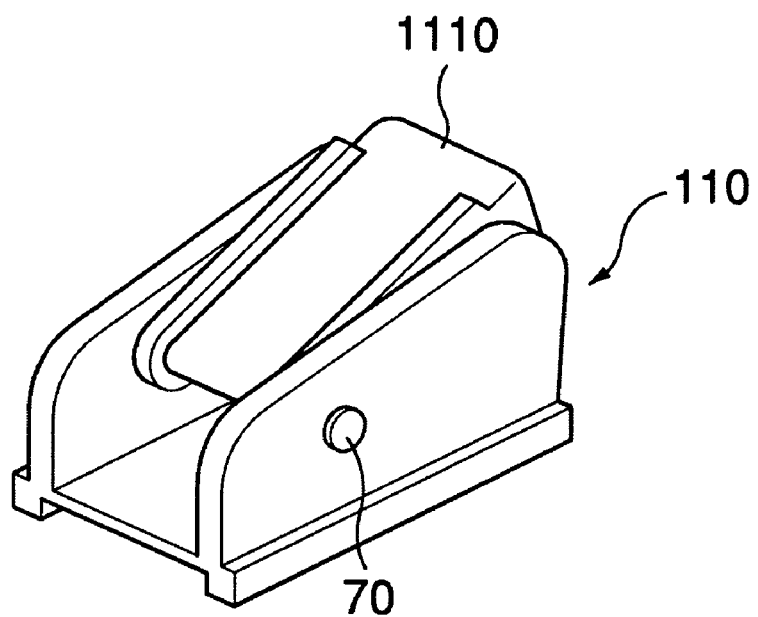
FIG. 10 shows a perspective view of a connector of the wiper blade assembly according to the present invention.
Figure 11:
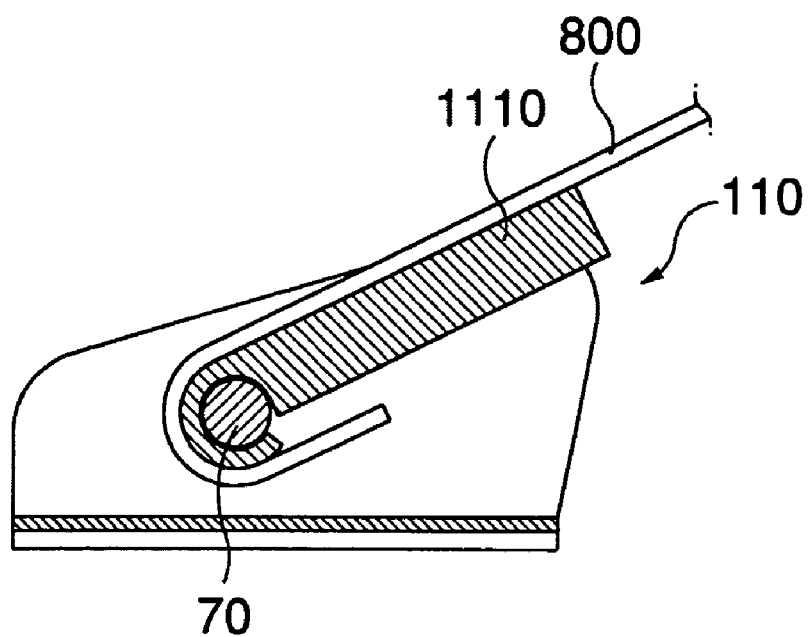
FIG. 11 shows a sectional view showing a state where a wiper arm is connected to the connector shown in FIG. 10.

FIG. 10 shows a perspective view of the connector assembly 110 of the wiper blade assembly 1000 according to the present invention, and FIG. 11 is a sectional view illustrating a state where a wiper arm 800 is fastened to the connector assembly 110. A connector 1100 is fixed to the connector assembly 110 by means of a pin 70 through a riveting process.

Although the connector 1100 shown in FIGS. 10 and 11 is a so-called "U hook type" connector, any kinds of connectors can be used in the wiper blade assembly 1000 of the present invention. That is, in addition to the connector shown in FIGS. 10 and 11, all kinds of known connectors, for example, a top locking type connector, a side locking type connector and the like can be applied to the present invention.

According to the present invention as described above, since the elastic support member is provided to the wiper blade assembly called the flat blade wiper in the longitudinal direction of the wiper strip, there is an advantage in that longitudinal rigidity of the wiper blade assembly can be further increased.

If the longitudinal rigidity of the wiper blade assembly is increased as described above, the shaking or chattering phenomenon due to the repeated motions of the wiper blade assembly is reduced.

Further, there is other advantages in that the wiper strip and the elastic support member can be easily connected to each other by means of the connection member including the inserting portion(s) and the claw, and that unit cost of production of the wiper blade assembly is lowered as compared with the conventional flat blade wiper.

Furthermore, there is another advantage in that the assembly time can be remarkably shortened by connecting the connection member and the elastic support member in one touch mode.

In addition, since the spoiler is provided on the upper portion of the elastic support member, the reduction of wiping performance caused by the rise of the wiper blade assembly from the vehicle windshield can be prevented even though the vehicle travels at a high speed. Finally, since both lateral ends of the spoiler are shaped as a claw, a fastening force between the spoiler and the elastic support member can be increased.

Although the present invention has been described in connection with the embodiments illustrated in the accompanying drawings, the scope of the present invention is defined by the appended claims and it should not be construed as being limited to the embodiments.

It should be understood that various substitutions, modifications and changes obvious to those skilled in the art and made without departing from the spirit of the present invention will fall within the scope of the present invention.

What is claimed is:

1. A wiper blade assembly for a motor vehicle, comprising:
    a flexible elongated wiper strip that includes opposite longitudinal grooves and comes into close contact with a windshield of the vehicle;
    a rail spring including rail portions disposed in the opposite grooves of the wiper strip;
    an elastic support member that extends along a longitudinal direction of the wiper strip and includes a plurality of openings; and
    a connection member which includes an inserting portion inserted in the opening of the elastic support member for connection with the elastic support member and a claw for holding both the wiper strip and the rail spring;
    wherein the connection member and the elastic support member are connected with each other by means of welding.

2. The wiper blade assembly as claimed in claim 1, wherein the inserting portion and the claw are formed integrally with each other.

3. A wiper blade assembly for a motor vehicle, comprising:
    a flexible elongated wiper strip that includes opposite longitudinal grooves and comes into close contact with a windshield of the vehicle;
    a rail spring including rail portions disposed in the opposite grooves of the wiper strip;
    an elastic support member that extends along a longitudinal direction of the wiper strip and includes a plurality of openings; and
    a connection member which includes an inserting portion inserted in the opening of the elastic support member for connection with the elastic support member and a claw capable of holding both the wiper strip and the rail spring,
    wherein the inserting portion of the connection member includes a pair of elastic pieces which can be elastically deformed into a state where the elastic pieces can pass through the opening of the elastic support member and can be elastically restored to a state where the elastic pieces can be caught into the elastic support member not to come out from the opening after the elastic pieces have passed through the opening.

4. The wiper blade assembly as claimed in claim 3, wherein each of the elastic pieces has a sectional shape of a sector as viewed from a lateral direction of the elastic support member.

5. The wiper blade assembly as claimed in claim 3 or 4, wherein a spoiler is provided on a top surface of the elastic support member.

6. The wiper blade assembly as claimed in claim 5, wherein the spoiler includes a claw portion for holding the elastic support member and is attached to the elastic support member by means of an adhesive.

7. The wiper blade assembly as claimed in claim 6, wherein the claw portion covers an entire bottom surface of the elastic support member.

8. The wiper blade assembly as claimed in claim 5, further comprising a connector for connecting a wiper arm to the substantial center of the elastic support member, wherein the spoiler is separated at a position of the connector on the top surface of the elastic support member.

* * * * *